Jan. 13, 1931.  R. J. L. HILDYARD  1,789,176
MEANS FOR LOCKING BOLTS AND NUTS
Filed April 18, 1928
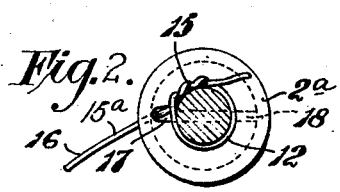
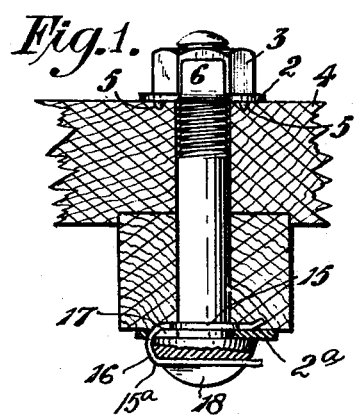
Inventor
R. J. L. Hildyard
By [signature]
Atty Patented Jan. 13, 1931

1,789,176

UNITED STATES PATENT OFFICE

RONALD JOHN LIVINGSTONE HILDYARD, OF MELBOURNE, VICTORIA, AUSTRALIA

MEANS FOR LOCKING NUTS AND BOLTS

Application filed April 18, 1928, Serial No. 270,967, and in Australia January 7, 1928.

This invention has been devised to provide improved means for locking nuts and bolts of all types so as to prevent same from working loose, even when they are subjected to great vibration and heavy strains. The locking means are simple, cheap to produce, convenient to apply and in practice will be found most effective for the purpose devised.

The invention basically comprises a locking member adapted for insertion between the workpiece and the nut or the bolt head, said locking member being adapted to be restrained against rotation and provided with means for engaging the nut or bolt head whereby the nut or bolt is locked against rotation.

In the accompanying drawings:—

Figure 1 is a vertical sectional view, with parts in elevation, illustrating the invention.

Figure 2 is a transverse section, with parts in plan, showing the locking means in applied position.

Referring to the drawing 2 is a locking washer adapted for insertion between the nut 3 and the workpiece 4 of wood or other non-metallic material. This washer is provided with teats or small projections 5 preferably pressed therefrom and adapted to penetrate the work-piece when the nut is tightly screwed against the said washer. The penetration of the teats or projections 5 into the workpiece locks the washer against rotation.

The locking washer has one or more lateral and integral lugs or projections 6 adapted to be upturned to engage the nut when same is screwed home and thus function as a lock to prevent unscrewing movement of the nut on the bolt. These lugs or projections of the washer can be of required size and design to engage a side or sides, or side and top portions of the nut.

The locking washer having been interposed between the nut 3 and workpiece 4, and the nut having been tightly screwed home, the lateral lugs or projections 6 of the locking washer are bent upwardly against the sides of the nut as shown in Figure 2. The teats or projections 5 by penetrating into the workpiece hold the locking washer stationary, while the lugs 6 on said washer prevent unscrewing of the nut even under conditions of great vibration.

When it is required to remove a nut from its bolt, it is only necessary to knock down the lugs 6 of the washer until they are in their original position to thus release the nut, which latter is then removable by the use of a wrench in the ordinary manner.

In order that the bolt may also be locked in addition to the locking of the nut, a locking washer $2^a$ is applied to the head of the bolt, and a wire $15^a$ is employed. This tie wire is passed around the bolt and twisted as at 15 beneath the locking washer to penetrate into the workpiece and the free end 16, is passed through a hole 17 provided in the locking washer. The free end 16 is then bent inwardly and is seated in the usual slot 18 of the bolt head.

By this construction and arrangement one end of the wire is impressed in the wood and the opposite end is seated in the slot in the head of the screw and the bolt is prevented from turning.

What I do claim is:—

1. Improved means for locking bolts and the like against rotation comprising, a locking washer adapted to be inserted between the bolt head and the workpiece, and a tie wire having a portion encircling the bolt beneath the bolt head and another portion of said tie wire which is adapted to be passed through a hole in the locking washer to fit into a slot or recess in the bolt head.

2. An improved means for locking nuts, bolts and the like against rotation, as claimed in claim 1, wherein the tie wire is wound about the bolt directly beneath the locking washer, so that such tie wire may be forced into the workpiece when the nut or bolt head is tightened.

In testimony whereof I affix my signature.

RONALD J. L. HILDYARD.